US008780773B2

(12) United States Patent
Oshime

(10) Patent No.: US 8,780,773 B2
(45) Date of Patent: Jul. 15, 2014

(54) MOBILE COMMUNICATION TERMINAL, MODE SWITCHING METHOD, AND NETWORK SWITCHING METHOD

(71) Applicant: KYOCERA Corporation, Kyoto (JP)

(72) Inventor: Haruyoshi Oshime, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/679,806

(22) Filed: Nov. 16, 2012

(65) Prior Publication Data

US 2013/0143619 A1    Jun. 6, 2013

Related U.S. Application Data

(63) Continuation of application No. 12/300,787, filed as application No. PCT/JP2007/059451 on May 7, 2007, now Pat. No. 8,340,114.

(30) Foreign Application Priority Data

May 16, 2006   (JP) .................................. 2006-136092

(51) Int. Cl.
*H04B 7/00* (2006.01)
*H04L 12/50* (2006.01)
*H04J 3/17* (2006.01)
*H04L 12/66* (2006.01)
*H04J 3/00* (2006.01)
*H04M 11/00* (2006.01)

(52) U.S. Cl.
USPC ........... 370/310; 370/360; 370/386; 370/433; 370/463; 370/464; 370/908; 455/403

(58) Field of Classification Search
USPC ......... 370/254, 255, 310, 328, 329, 331, 338, 370/339, 431, 433, 437, 463, 464; 455/39, 455/67.11, 73, 550.1, 552.1, 553.1, 91, 94, 455/115.1, 127.1, 127.4, 130, 226.1, 230, 455/403, 422.1, 428, 432.1, 435.1, 435.2, 455/436–444, 3.01, 3.03, 3.04
See application file for complete search history.

(56) References Cited

U.S. PATENT DOCUMENTS 7,167,484 B2 * 1/2007 Liang et al. .................. 370/445
7,200,117 B2   4/2007 Chiu et al.
(Continued)

FOREIGN PATENT DOCUMENTS

JP    H10-126851 A    5/1998
JP    H10-294782 A    11/1998
(Continued)

OTHER PUBLICATIONS

First Office Action issued in counterpart Chinese Application No. 200780027000.9.

(Continued)

*Primary Examiner* — Omar Ghowrwal
(74) *Attorney, Agent, or Firm* — Procopio, Cory, Hargreaves & Savitch LLP

(57) ABSTRACT

In order to input/output only necessary information in accordance with the form of application, a mobile phone includes: a wireless circuit 22 to connect to a first network in order to communicate with a device connected to the first network; a wireless LAN circuit 23 to connect to a second network different from the first network in order to communicate with a device connected to the second network; and a setting mode switching portion 21 to switch between a first setting mode capable of activating wireless circuit 22 and wireless LAN circuit 23 and a second setting mode capable of activating only wireless circuit 22 among wireless circuit 22 and wireless LAN circuit 23.

15 Claims, 11 Drawing Sheets

(56) References Cited

U.S. PATENT DOCUMENTS

| | | | |
|---|---|---|---|
| 7,283,507 B2 | 10/2007 | Buckley | |
| 8,340,114 B2* | 12/2012 | Oshime | 370/433 |
| 2002/0191562 A1 | 12/2002 | Kumaki et al. | |
| 2003/0073457 A1 | 4/2003 | Wang et al. | |
| 2004/0003060 A1 | 1/2004 | Asoh et al. | |
| 2004/0045027 A1 | 3/2004 | Takamura et al. | |
| 2004/0151162 A1 | 8/2004 | Ramaswamy | |
| 2004/0192222 A1* | 9/2004 | Vaisanen et al. | 455/78 |
| 2005/0232209 A1 | 10/2005 | Buckley et al. | |
| 2006/0083261 A1 | 4/2006 | Maeda et al. | |
| 2007/0087766 A1* | 4/2007 | Hardy et al. | 455/466 |
| 2007/0264977 A1* | 11/2007 | Zinn et al. | 455/414.1 |
| 2008/0214231 A1 | 9/2008 | Leedom | |
| 2013/0225241 A1 | 8/2013 | Scott | 455/564 |
| 2014/0011485 A1* | 1/2014 | Forstall et al. | 455/414.1 |

FOREIGN PATENT DOCUMENTS

| | | | |
|---|---|---|---|
| JP | 2003-091467 A | 3/2003 |
| JP | 2003-125452 A | 4/2003 |
| JP | 2003-338856 A | 11/2003 |
| JP | 2006-121192 A | 5/2006 |

OTHER PUBLICATIONS

Electronic Design & Application World-Nikkei Electronics China, May 2005.

Notice of Ground of Rejected dated Feb. 15, 2011, issued in counterpart Japanese Application No. 2006-136092.

International Search Report dated Jul. 24, 2007, issued for International Application No. PCT/JP2007/059451.

SES Technology R&D Group, Introduction to the IrDA Protocol. Sep. 3, 1997.

Information Sciences Institute University of Southern California, RFC: 79. Internet Protocol Darpa Internet Program Protocol Specification, Sep. 1981.

R. Droms, Bucknell University, RFC: 2131. Dynamic Host Configuration Protocol , Mar. 1997.

International Telecommunication Union, ITU-T H.323. Packet-based multimedia communications systems, Jul. 2003.

Notice of Ground of Rejection issued in a divisional application No. 2011-088877 of the corresponding Japanese application, dated Apr. 9, 2013.

* cited by examiner

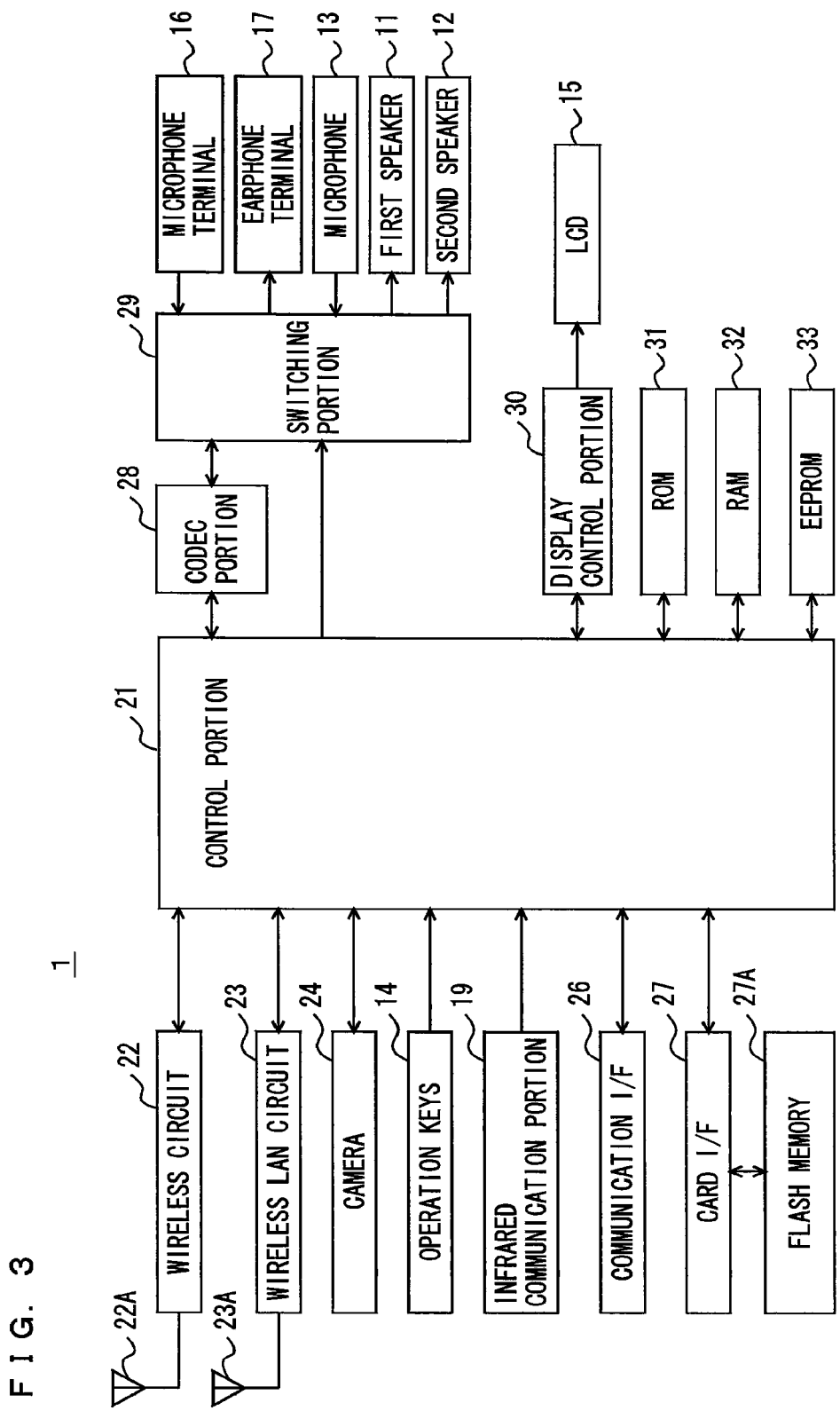

FIG. 4
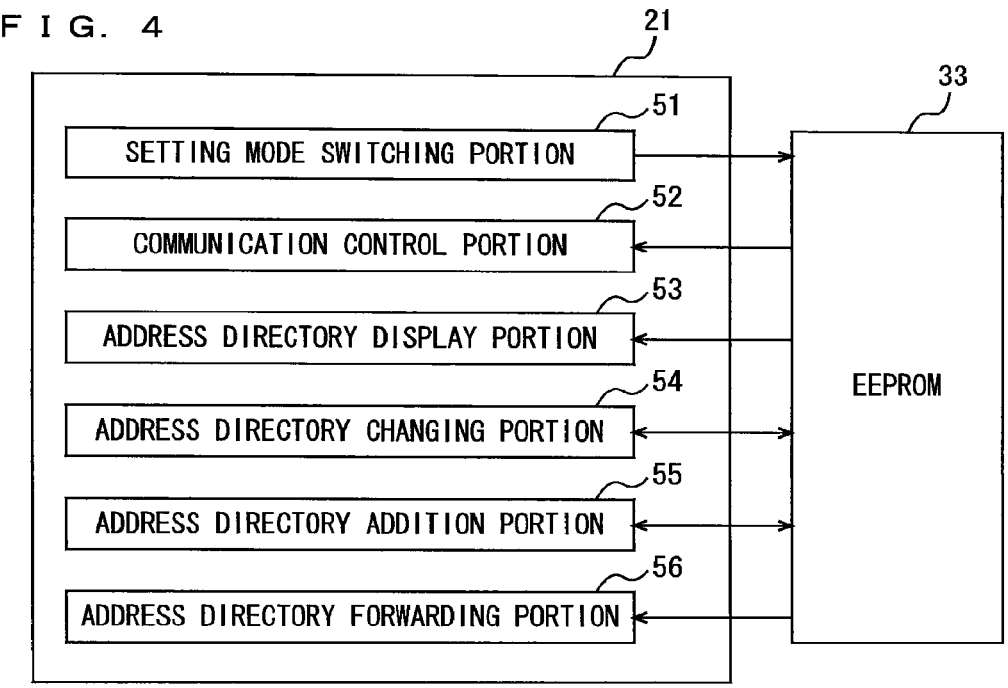
FIG. 5
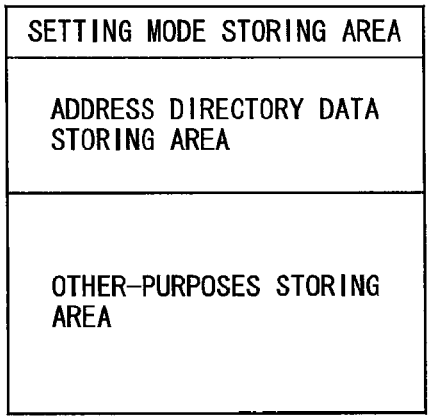
FIG. 6
ADDRESS DIRECTORY DATA
| IDENTIFICATION INFORMATION | FIRST INFORMATION | | SECOND INFORMATION | |
|---|---|---|---|---|
| NAME | TELEPHONE NUMBER | ELECTRONIC MAIL ADDRESS | EXTENSION NUMBER | INSTANT MESSAGE NUMBER |

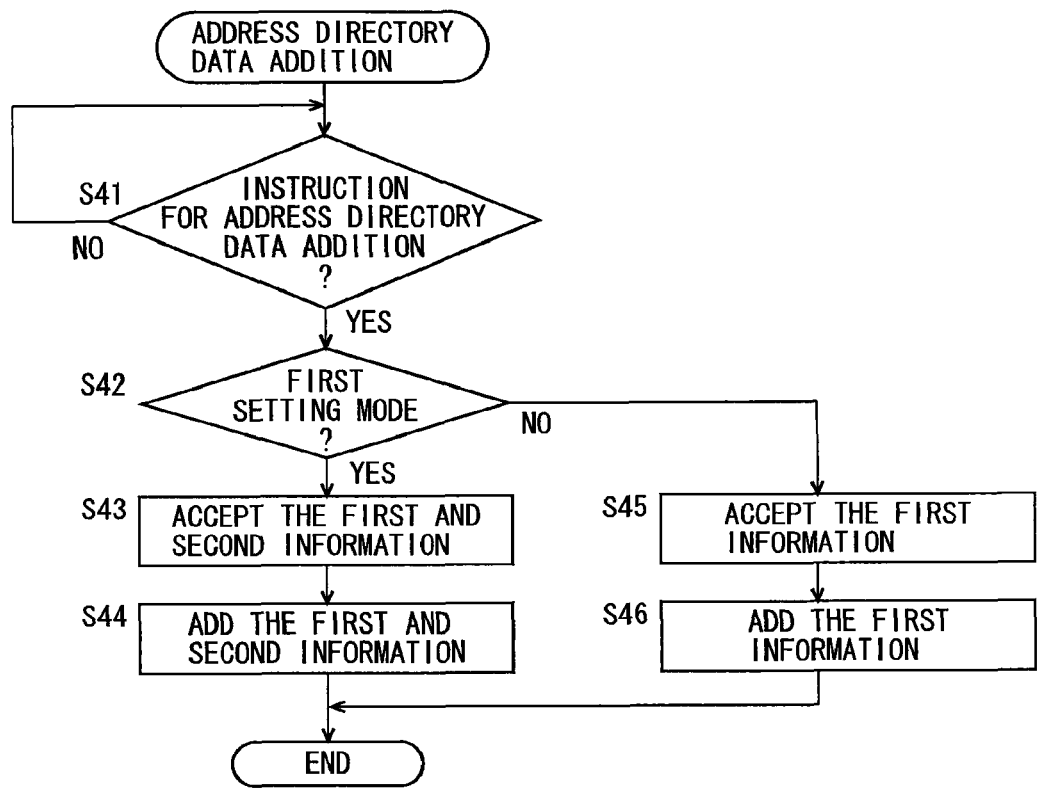

F I G. 14

ADDRESS DIRECTORY DATA

| IDENTIFICATION INFORMATION | FIRST INFORMATION | | SECOND INFORMATION | | | |
|---|---|---|---|---|---|---|
| | | | FIRST LAN | | SECOND LAN | |
| NAME | TELEPHONE NUMBER | ELECTRONIC MAIL ADDRESS | EXTENSION NUMBER | INSTANT MESSAGE NUMBER | EXTENSION NUMBER | INSTANT MESSAGE NUMBER |

F I G. 1 6

```
NAME               : SANYO TARO
TELEPHONE NUMBER   : 090-9999-9999
ELECTRONIC MAIL    : taro@sanyo.co.jp
COMPANY LAN
EXTENSION NUMBER   : 050-5555-5555
IM                 : taro@sanyolan.net
HOUSEHOLD LAN
EXTENSION NUMBER   : 050-5555-6666
IM                 : taro@homelan.net
```

MOBILE COMMUNICATION TERMINAL, MODE SWITCHING METHOD, AND NETWORK SWITCHING METHOD

CROSS-REFERENCE TO RELATED APPLICATIONS

The present application is a continuation of U.S. Pat. No. 8,340,114, issued on Dec. 25, 2012, which is the U.S. National Stage Application of International Application No. PCT/JP2007/059451, filed on May 7, 2007, and claims the benefit of Japanese Patent Application No. 2006-136092, filed on May 16, 2006, each of which is incorporated herein by reference in its entirety.

TECHNICAL FIELD

The present invention relates to a mobile communication terminal, a mode switching method, and a network switching method, and more particularly to a mobile communication terminal connectable to wireless LANs and a mode switching method and a network switching method that are executed in the mobile communication terminal.

BACKGROUND ART

In recent years, local area networks utilizing wireless communication (hereinafter referred to as "wireless LANs") have become popular, and it is possible to use wireless communication terminals connected to wireless LANs as IP (Internet Protocol) telephones. Conventional mobile phones are each provided with a communication function that makes a telephone call or the like by making a wireless connection to a network provided by a telephone service provider, and in addition to this communication function, it is possible to install a function that establishes a communication by making a wireless connection to a wireless LAN and use a mobile phone as an IP phone. However, not all mobile phones would need to function as IP phones, and there is a need for a mobile phone that enables selection as to whether the mobile phone functions as an IP phone as desired by a user thereof.

Mobile phones each have a telephone directory function and store telephone directory data that associates telephone numbers for making calls to telephones of called parties with the names or the like of the called parties. Use of this telephone directory data is convenient in that there is no need for remembering telephone numbers assigned to the telephones of the called parties. In the case where a mobile phone functions as an IP phone, in order to make a call to another IP phone connectable to the wireless LAN, it is necessary to make a call to the telephone number assigned to the other IP phone, and this telephone number differs from the one assigned to the mobile phone by the telephone service provider. This requires the telephone directory data to separately store the telephone number assigned to the mobile phone and the telephone number assigned to the IP phone (this telephone number being hereinafter referred to as an "extension number").

Japanese Patent Laid-Open No. 10-126851 (Patent Document 1) discloses an information processing device that stores two kinds of telephone numbers in one piece of telephone directory data, although this is not a mobile phone that can be used as a mobile phone and an IP phone. The information processing device disclosed in Japanese Patent Laid-Open No. 10-126851 is provided with a telephone function that has at least two communication modes including a public mode and a transceiver mode, and characterized in including: storing means of storing a normal telephone number used in the public mode and an extension number used in the transceiver mode in association with a name; specifying means of specifying the name of a called party; extension number judging means of judging whether the storing means stores an extension number that corresponds to the name of the called party specified by the specifying means; and communication mode switching means of, as a result of the extension number judgment, switching to the transceiver mode when the storing means stores an extension number corresponding to the name of the called party and reading the extension number corresponding to the name of the called party from the storing means to make a call to the extension number, while when the storing means stores no extension numbers corresponding to the name of the called party, switching to the public mode and reading a normal telephone number that corresponds to the name of the called party from the storing means to make a call to the telephone number.

However, even when the conventional information processing device is applied to a mobile phone that can also be used as an IP phone, the following problem arises. The problem is that in the case where the user of the mobile phone does not want it to function as an IP phone, displaying a telephone number assigned to the IP phone results in a display of unnecessary information. In particular, since mobile phones are small and limited in size for the display screens, unnecessary information is preferably not displayed.

Additionally, there is the problem that for the protocols for establishing a communication by connecting mobile phones to wireless LANs, the protocols are standardized in the lower layers of the OSI layer model, but in the upper layers, the protocols may vary for a plurality of kinds of wireless LANs.

[Patent Document 1] Japanese Patent Laid-Open No. 10-126851

DISCLOSURE OF THE INVENTION

Problems to be Solved by the Invention

The present invention has been accomplished to solve the above-described problems, and an object of the present invention is to provide a mobile communication terminal capable of easily switching between connectable networks.

Another object of the present invention is to provide a mobile communication terminal capable of inputting or outputting only necessary information in accordance with the form of application.

Another object of the present invention is to provide a mobile communication terminal capable of easily connecting to a plurality of wireless LANs.

Another object of the present invention is to provide a mode switching method for a mobile communication terminal such that the method is capable of easily switching between networks to which the mobile communication terminal is connectable.

Another object of the present invention is to provide a network switching method that enables easy connection to a plurality of wireless LANs.

Means for Solving the Problems

To achieve the above-described objects, according to an aspect of the present invention, a mobile communication terminal includes: a first communication portion to connect to a first network in order to communicate with a device connected to the first network; a second communication portion to connect to a second network different from the first network in order to communicate with a device connected to the second network; and a switching portion to switch between a first setting mode capable of activating the first and second communication portions and a second setting mode capable of activating only the first communication portion among the first and second communication portions.

According to this aspect of the present invention, when the mobile communication terminal is switched to the first setting mode, the terminal can communicate with a device connected to the first network or the second network, while when the terminal is switched to the second setting mode, the terminal can communicate only with a device connected to the first network. Thus, merely switching between the setting modes can limit connectable networks. As a result, a mobile communication terminal capable of easily switching between connectable networks is provided.

Preferably, the mobile communication terminal further includes: a communication destination information storing portion to include: an area for storing first communication destination information for identifying the device connected to the first network in order to communicate with the device; and an area for storing second communication destination information for identifying the device connected to the second network in order to communicate with the device; and an input/output control portion to control input/output of the first and second communication destination information stored in the communication destination information storing portion based on whether switching is made to the first setting mode or the second setting mode.

According to this aspect of the present invention, the mobile communication terminal stores first communication destination information for identifying the device connected to the first network in order to communicate with the device and second communication destination information for identifying the device connected to the second network in order to communicate with the device, and controls input/output of the first and second communication destination information based on whether switching is made to the first setting mode or the second setting mode. Thus, a mobile communication terminal capable of inputting or outputting only necessary information in accordance with the form of application is provided.

Preferably, the input/output control portion includes a display portion to display the first and second communication destination information among the first and second communication destination information when the switching is made to the first setting mode, or to display only the first communication destination information among the first and second communication destination information when the switching is made to the second setting mode.

Preferably, the input/output control portion includes: a change accepting portion to accept a change in at least either the first communication destination information or the second communication destination information when the switching is made to the first setting mode, or to accept a change in only the first communication destination information among the first and second communication destination information when the switching is made to the second setting mode; and a changing portion to change the first and second communication destination information stored in the communication destination information storing portion in accordance with the change accepted by the change accepting portion.

Preferably, the changing portion includes a deleting portion to, when the switching is made to the second setting mode, change the first communication destination information in accordance with the accepted change, and to delete the second communication destination information associated with the first communication destination information.

Preferably, the input/output control portion includes: a first registration portion to, when the switching is made to the first setting mode, accept addition of at least either the first communication destination information or the second communication destination information, and to add at least either the first communication destination information or the second communication destination information thus accepted to the communication destination information storing portion, thus storing the accepted communication destination information; and a second registration portion to, when the switching is made to the second setting mode, accept addition of only the first communication destination information among the first and second communication destination information, and to add the accepted first communication destination information to the communication destination information storing portion, thus storing the accepted communication destination information.

Preferably, the mobile communication terminal further includes a third communication portion to communicate with an external device, and the input/output control portion includes a transmitting portion to control the third communication portion in order to transmit to the external device the first and second communication destination information among the first and second communication destination information when the switching is made to the first setting mode, or in order to transmit to the external device only the first communication destination information among the first and second communication destination information when the switching is made to the second setting mode.

Preferably, the second network includes a plurality of local area networks; the area for storing second communication destination information included in the communication destination information storing portion stores a plurality of kinds of second communication destination information each corresponding to a different one of the plurality of local area networks; the mobile communication terminal further includes a selection accepting portion to accept selection of one of the plurality of local area networks; and when the switching is made to the first setting mode and when the selection accepting portion accepts the selection, then the input/output control portion controls input/output of one kind of second communication destination information among the plurality of kinds of second communication destination information, the one kind of second communication destination information corresponding to a selected local area network among the plurality of local area networks.

Preferably, the second network includes a plurality of local area networks, and the mobile communication terminal further includes: an application program storing portion to store application programs each corresponding to a different one of the plurality of local area networks; a selection accepting portion to accept selection of one of the plurality of local area networks; and an application program activating portion to, upon selection of one of the plurality of local area networks by the selection accepting portion, execute an application program corresponding to the selected local area network, when switching is made to the first setting mode.

Preferably, the first network is a communication network provided by a telephone service provider, and the second network is a wireless LAN (Local Area Network).

According to another aspect of the present invention, a mobile communication terminal includes: a communication portion to connect to one of a plurality of local area networks in order to communicate with a device connected to the connected local area network; an application program storing portion to store application programs each corresponding to a different one of the plurality of local area networks; a selection accepting portion to accept selection of one of the plurality of local area networks; and an application program activating portion to, upon selection of one of the plurality of local area networks by the selection accepting portion, execute an application program corresponding to the selected local area network.

According to this aspect of the present invention, when selection of one of a plurality of local area networks is accepted, an application program corresponding to a selected second network is executed, and therefore, even if the plurality of local area networks have different communication protocols, application programs each corresponding to a different one of the plurality of local area networks may be stored. As a result, a mobile communication terminal capable of easily connecting to a plurality of wireless LANs is provided.

According to another aspect of the present invention, a mode switching method is executed in a mobile communication terminal including: a first communication portion to connect to a first network in order to communicate with a device connected to the first network; and a second communication portion to connect to a second network different from the first network in order to communicate with a device connected to the second network, wherein the method includes the step of switching between a first setting mode capable of activating the first and second communication portions and a second setting mode capable of activating only the first communication portion among the first and second communication portions.

According to this aspect of the present invention, a mode switching method for a mobile communication terminal is provided such that the method is capable of easily switching between networks to which the mobile communication terminal is connectable.

Preferably, the mode switching method further includes the steps of: storing first communication destination information for identifying the device connected to the first network in order to communicate with the device; storing second communication destination information for identifying the device connected to the second network in order to communicate with the device; and controlling input/output of the first and second communication destination information stored in a communication destination information storing portion based on whether switching is made to the first setting mode or the second setting mode.

Preferably, the input/output controlling step displays the first and second communication destination information among the first and second communication destination information when the switching is made to the first setting mode, and displays only the first communication destination information among the first and second communication destination information when the switching is made to the second setting mode.

Preferably, the input/output controlling step includes the steps of: accepting a change in at least either the first communication destination information or the second communication destination information when the switching is made to the first setting mode, or accepting a change in only the first communication destination information among the first and second communication destination information when the switching is made to the second setting mode; and changing the stored first and second communication destination information in accordance with the accepted change.

Preferably, the changing step includes the step of, when the switching is made to the second setting mode, changing the first communication destination information in accordance with the accepted change, and deleting the second communication destination information associated with the first communication destination information.

Preferably, the input/output controlling step includes the steps of: when the switching is made to the first setting mode, accepting addition of at least either the first communication destination information or the second communication destination information, and adding at least either the first communication destination information or the second communication destination information thus accepted, thus storing the accepted communication destination information; and when the switching is made to the second setting mode, accepting addition of only the first communication destination information among the first and second communication destination information, and adding the accepted first communication destination information, thus storing the accepted communication destination information.

Preferably, the mobile communication terminal further includes a third communication portion to communicate with an external device; and the input/output controlling step controls the third communication portion in order to transmit to the external device the first and second communication destination information among the first and second communication destination information when the switching is made to the first setting mode, or in order to transmit to the external device only the first communication destination information among the first and second communication destination information when the switching is made to the second setting mode.

Preferably, the second network includes a plurality of local area networks; the area for storing second communication destination information included in the communication destination information storing portion stores a plurality of kinds of second communication destination information each corresponding to a different one of the plurality of local area networks; the mobile communication terminal further includes a selection accepting portion to accept selection of one of the plurality of local area networks; and when the switching is made to the first setting mode and when the selection accepting portion accepts the selection, then the input/output control portion controls input/output of one kind of second communication destination information among the plurality of kinds of second communication destination information, the one kind of second communication destination information corresponding to a selected local area network among the plurality of local area networks.

Preferably, the second network includes a plurality of local area networks; the mobile communication terminal includes an application program storing portion to store application programs each corresponding to a different one of the plurality of local area networks; and the method further includes the steps of: accepting selection of one of the plurality of local area networks; and upon selection of one of the plurality of local area networks, executing an application program corresponding to the selected local area network, when switching is made to the first setting mode.

Preferably, the first network is a communication network provided by a telephone service provider, and the second network is a wireless LAN (Local Area Network).

According to another aspect of the present invention, a network switching method is executed in a mobile communication terminal including: a communication portion to connect to one of a plurality of local area networks in order to communicate with a device connected to the connected local area network; and an application program storing portion to store application programs each corresponding to a different one of the plurality of local area networks, wherein the method includes the steps of: accepting selection of one of the plurality of local area networks; and executing an application program corresponding to the selected local area network upon selection of one of the plurality of local area networks.

According to this aspect of the present invention, a network switching method that enables easy connection to a plurality of wireless LANs is provided.

BRIEF DESCRIPTION OF THE DRAWINGS

FIG. 3 is a functional block diagram showing an example of the function of a mobile phone according to an embodiment of the present invention.

FIG. 4 is a functional block diagram schematically showing the function of a control portion of the mobile phone.

FIG. 5 is a diagram showing an example of the storing area of an EEPROM.

FIG. 6 is a diagram showing an example of the format of address directory data.

FIG. 9 is a diagram showing an example of an address directory data display screen in a first setting mode.

FIG. 10 is a diagram showing an example of the address directory data display screen in a first setting mode.

FIG. 11 is a flowchart showing an example of the flow of address directory data addition processing.

FIG. 14 is a diagram showing an example of the format of address directory data according to the second embodiment of the present invention.

FIG. 16 is another diagram showing an example of the address directory data display screen in the first setting mode.

DESCRIPTION OF REFERENCE CHARACTERS

Figure 1:
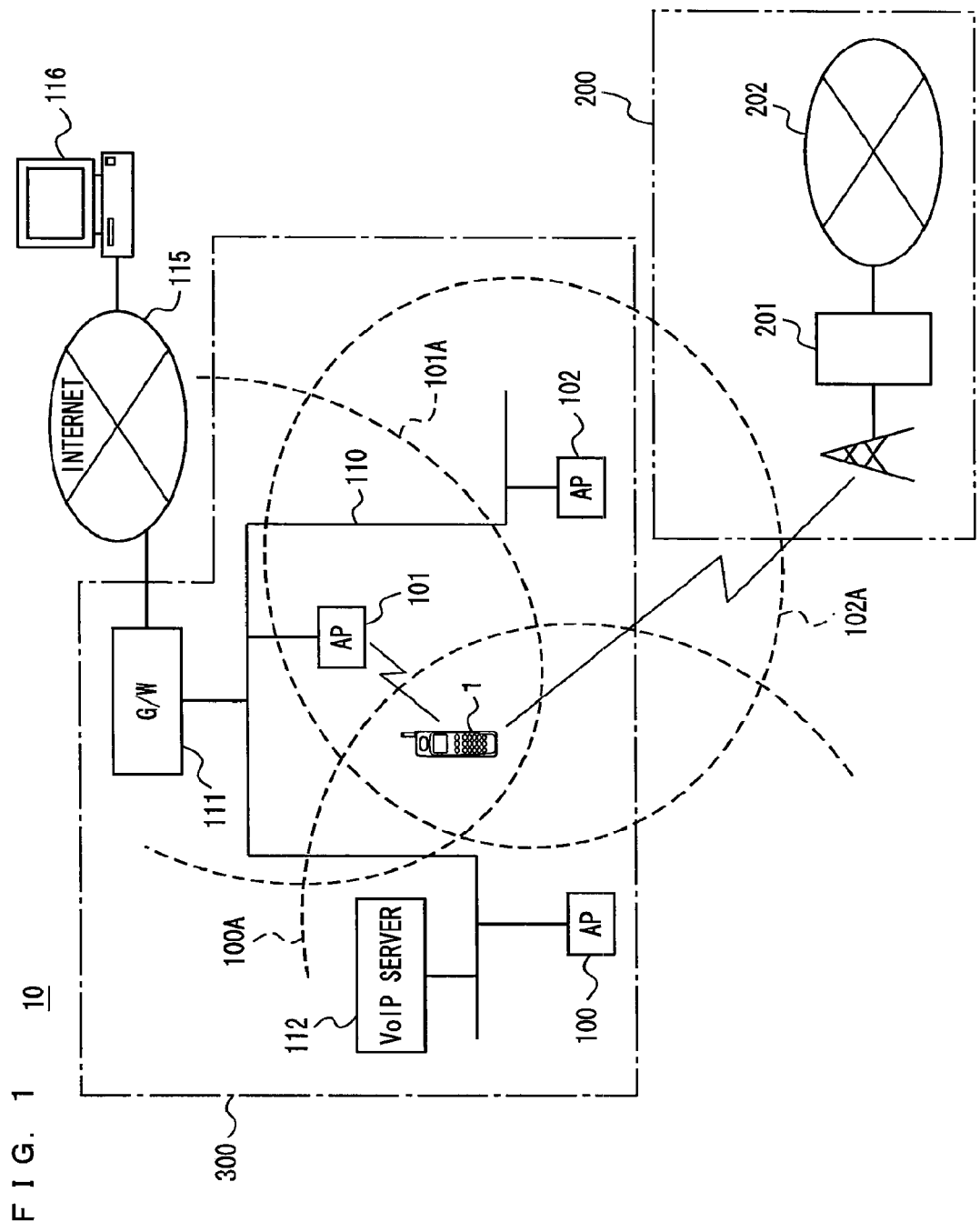
FIG. 1 is a diagram schematically showing a communication system according to an embodiment of the present invention.

1: mobile phone; 2: display side portion; 3: operation side portion; 10: communication system; 11: first speaker; 12: second speaker; 13: microphone; 14: operation keys; 16: microphone terminal; 17: earphone terminal; 19: infrared communication portion; 21: control portion; 22: wireless circuit; 23: wireless LAN circuit; 24: camera; 26: communication I/F; 27: card I/F; 27A: flash memory; 28: codec portion; 29: switching portion; 30: display control portion; 31: ROM; 32: RAM; 33: EEPROM; 51: setting mode switching portion; 52: communication control portion; 53: address directory display portion; 54: address directory addition portion; 55: address directory adding portion; 56: address directory forwarding portion; 100-102: access points; 110: LAN cable; 112: VoIP server; 115: Internet; 116: computer; 200: mobile phone system; 201: base station apparatus; 202: communication network; 300: wireless LAN system.

BEST MODES FOR CARRYING OUT THE INVENTION

Embodiments of the present invention will now be described with reference to the drawings. In the following description, like reference characters denote like parts, which have like names and functions, and therefore, detailed description thereof will not be repeated.

<First Embodiment>

FIG. 1 is a diagram schematically showing a communication system according to this embodiment. Referring to FIG. 1, a communication system 10 includes a mobile phone system 200 and a wireless LAN system 300. Mobile phone system 200 is a system provided by a telephone service provider, and the example here includes a communication network 202, a base station apparatus 201 connected to communication network 202, and a mobile phone 1 that carries out wireless communication with base station apparatus 201. While the description here is made with one base station apparatus 201, the number of base station apparatuses 201 is not limited. Base station apparatus 201 is a wireless station apparatus that functions as a repeater for communication network 202. Mobile phone 1, when located in a communicable area of base station apparatus 201, carries out wireless communication with base station apparatus 201 in order to be connected to communication network 202. Communication network 202, which is provided by the telephone service provider, will be referred to as a first network here.

Wireless LAN system 300 includes mobile phone 1, three access points (AP) 100 to 102, a VoIP (Voice Internet Protocol) server 112, and a gateway (G/W) 111. AP 100 to 102, VoIP server 112, and G/W 111 are connected to a LAN cable 110 in order to constitute a second network where data transmission/reception is possible by them. While the description here is made with three access points 100 to 102, this is not intended to limit the number of access points and one access point will suffice. Access points 100 to 102 are wireless stations apparatuses that function as repeaters for the LAN. Mobile phone 1 is capable of carrying out wireless communication with at least one of access points 100 to 102, and upon wireless communication with at least one of access points 100 to 102, mobile phone 1 is connected to the second network and becomes capable of communicating with VoIP server 112 and G/W 111.

The second network is connected to an Internet 115 through G/W 111. This enables mobile phone 1 to communicate with a computer 116 connected to Internet 115 while mobile phone 1 is connected to the second network.

Access points 100 to 102 are usually fixed to the ground so that respective communicable areas are determined. Mobile phone 1, when located in a communicable area 100A of access point 100, is capable of carrying out wireless communication with access point 100 while incapable of carrying out wireless communication with access point 100 when located outside communicable area 100A. Mobile phone 1, when located in a communicable area 101A of access point 101, is capable of carrying out wireless communication with access point 101 while incapable of carrying out wireless communication with access point 101 when located outside communicable area 101A. Mobile phone 1, when located in a communicable area 102A of access point 102, is capable of carrying out wireless communication with access point 102 while incapable of carrying out wireless communication with access point 102 when located outside communicable area 102A.

Communicable area 100A of access point 100, communicable area 101A of access point 101, and communicable area 102A of access point 102 have an area where all the three overlap, areas where two overlap, and areas where there is no overlapping. When mobile phone 1 is located as shown in FIG. 1, this location is within the area where all communicable areas 100A to 102A of access points 100 to 102 overlap. This enables mobile phone 1 to carry out wireless communication with any of access points 100 to 102. When mobile phone 1 communicates with any one of access points 100 to 102, an identifier is used such as SSID (Service Set Identifier) and ESSID (Extended SSID). This enables mobile phone 1 to carry out wireless communication with an access point that mobile phone 1 selects from access points 100 to 102, even when mobile phone 1 is located in the area where communicable areas 100A to 102A overlap.

VoIP server 112 mediates the communication between mobile phone 1 and opposite devices connected to the second network. The opposite devices include computers connected to the second network, IP phones, and other mobile phones that communicate with any of access points 100 to 102. VoIP server 112 stores in advance a user table that associates device identification information for identifying mobile phone 1 with an extension number assigned in advance to mobile phone 1. Upon connection of mobile phone 1 to the second network, VoIP server 112 associates an IP address assigned to mobile phone 1 with the extension number assigned to mobile phone 1. For example, description will be made of the case where a first mobile phone is assigned first device identification information and a first extension number, and a second mobile phone is assigned second device identification information and a second extension number. The first mobile phone, when connected to the second network, is assigned a first IP address from a DHCP (Dynamic Host Configuration Protocol) server and acquires the first IP address from the DHCP server. Then, when the first mobile phone requests VoIP server 112 for registration of the first IP address, VoIP server 112 associates the first extension number with the first IP address. Likewise, the second mobile phone, when connected to the second network, is assigned a second IP address from the DHCP server and acquires the second IP address from the DHCP server. Then, when the second mobile phone requests VoIP server 112 for registration of the second IP address, VoIP server 112 associates the second extension number with the second IP address. When the first mobile phone transmits the second extension number to VoIP server 112, the VoIP server mediates between the first and second mobile phones in order to enable communication of transmission/reception of IP packets between the first and second mobile phones. This makes the first and second mobile phones function as IP phones, thereby enabling communication. It is also possible that the first mobile phone acquires from VoIP server 112 the second IP address assigned to the second mobile phone by transmitting the second extension number to the VoIP server, so that IP packets are transmitted/received directly between the first and second mobile phones.

Figure 2A:
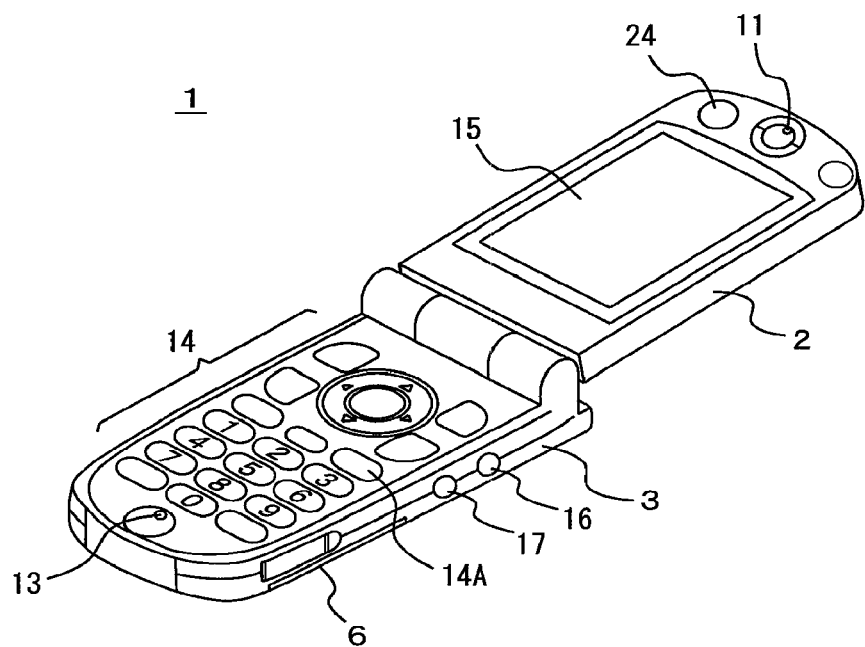
FIGS. 2A and B are perspective views of a mobile phone according to an embodiment of the present invention, showing the appearance of the mobile phone.
Figure 2B:
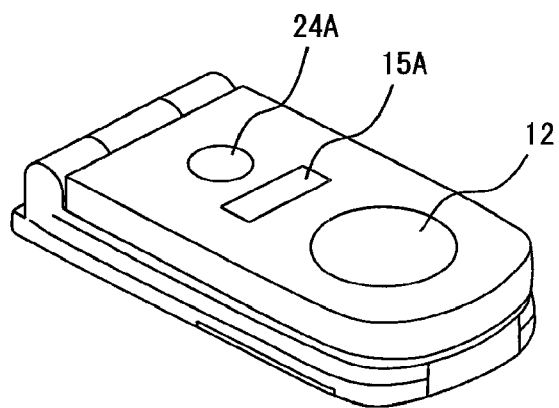

FIGS. 2A and 2B are perspective views of a mobile phone according to an embodiment of the present invention, showing the appearance of the mobile phone. FIG. 2A shows the appearance of the mobile phone in an open style, and FIG. 2B shows the appearance of the mobile phone in a closed style. Referring to FIGS. 2A and 2B, mobile phone 1 includes an operation side portion 3 and a display side portion 2. On the inner side surface of operation side portion 3, operation keys including a power key 14A, numeral keys, communication keys, and the like, and a microphone 13 are arranged, and on the right side surface, a microphone terminal 16 and an earphone terminal 17 are arranged. On the inner side surface of display side portion 2, a liquid crystal display device (LCD) 15, a first speaker 11 that constitutes a receiver, and a camera 24 are arranged, and on the outer side surface, a camera 24A, a small type LCD 15A, and a second speaker 12 are arranged. While description is made of an example where mobile phone 1 includes LCD 15, an organic EL (Electro Luminescence) display may be used instead of LCD 15. Operation side portion 3 and display side portion 2 are connected rotatably by means of a hinge mechanism, so that operation side portion 3 and display side portion 2 are freely opened/closed. The closed style of mobile phone 1 is such a state that mobile phone 1 is folded so that operation side portion 3 and display side portion 2 are in a closed state, and the open style of mobile phone 1 is such a state that mobile phone 1 is opened so that operation side portion 3 and display side portion 2 are in an open state.

FIG. 3 is a functional block diagram showing an example of the function of a mobile phone according to an embodiment of the present invention. Referring to FIG. 3, mobile phone 1 includes a control portion 21 that generally controls mobile phone 1, a wireless circuit 22 having an antenna 22A connected thereto, a wireless LAN circuit 23 having an antenna 23A connected thereto, a codec portion 28 that processes audio data, a switching portion 29 that switches input/output of codec portion 28, a microphone 13, a first speaker 11, a second speaker 12, a microphone terminal 16, an earphone terminal 17, which are connected to switching portion 29, a camera 24, operation keys 14 that accepts input a user's operation, an infrared communication portion 19, a communication interface (I/F) 26, a display control portion 30 that controls display of LCD 15, a ROM (Read Only Memory) 31 that stores a program and the like to be executed at control portion 21, a RAM (Random Access Memory) 32 used as a working area for control portion 21, an EEPROM (Electronically Erasable and Programmable ROM) 33 that stores address directory data, electronic mails, and the like in a nonvolatile manner, and a card interface (I/F) 27.

Wireless circuit 22 carries out wireless communication with base station apparatus 201 connected to communication network 202. Base station apparatus 201 transmits a wireless signal from its antenna, and antenna 22A receives the signal. Wireless circuit 22 is input the wireless communication received by antenna 22A and outputs to codec portion 28 an audio signal into which the wireless communication is demodulated. Also wireless circuit 22 is input an audio signal from codec portion 28 and outputs to antenna 22A a wireless signal into which the audio signal is modulated. The wireless signal transmitted from antenna 22A is received by the antenna of base station apparatus 201 and input to base station apparatus 201.

Wireless LAN circuit 23 carries out wireless communication with any one of access points 100 to 102. A wireless signal transmitted from the one of access points 100 to 102 is received by antenna 23A. Wireless LAN circuit 23 is input the wireless communication received by antenna 23A and outputs to codec portion 28 an audio signal into which the wireless communication is demodulated. Also wireless LAN circuit 23 is input an audio signal from codec portion 28 and outputs to antenna 23A a wireless signal into which the audio signal is modulated. The wireless signal transmitted from antenna 23A is received by one of access points 100 to 102.

Codec portion 28 decodes the audio signal input from wireless circuit 22 or wireless LAN circuit 23, converts the decoded digital audio signal into an analogue signal and amplifies it, and outputs the signal to switching portion 29. Also codec portion 28 is input through switching portion 29 an analogue audio signal from microphone 13 or microphone terminal 16, converts the audio signal into a digital signal and encodes it, and outputs the encoded audio signal to wireless circuit 22 or wireless LAN circuit 23.

Switching portion 29 is controlled by control portion 29 and switches the input/output of the audio signal transmitted to codec portion 28. Switching portion 29 outputs the audio signal accepted from codec portion 28 to any of earphone terminal 17, first speaker 11, and second speaker 12. When an earphone is connected to earphone terminal 17, switching portion 29 outputs the audio signal accepted from codec portion 28 to earphone terminal 17. When no earphone is connected to earphone terminal 17, switching portion 29 outputs the audio signal accepted from codec portion 28 to second speaker 12 when mobile phone 1 is in a hands-free mode, and outputs the audio signal accepted from codec portion 28 to first speaker 11 when mobile phone 1 is not in a hands-free mode. By a user's operation of operation keys 14, mobile phone 1 is set at the hands-free mode. Even when mobile phone 1 is not set at the hands-free mode while being in a calling state in the open style, control portion 21 sets mobile phone 1 at the hands-free mode upon change of the state of mobile phone 1 to the closed style. Thus, switching portion 29 outputs the audio signal accepted from codec portion 28 to first speaker 11 when mobile phone 1 is not set at the hands-free mode while being in a calling state in the open style, and outputs the audio signal accepted from codec portion 28 to second speaker 12 upon change of the state of mobile phone 1 to the closed style.

Switching portion 29 outputs to codec portion 28 an audio signal output from microphone 13 or microphone terminal 16. When the microphone is connected to microphone terminal 16, switching portion 29 outputs to codec portion 28 an audio signal accepted from microphone terminal 16, and when the microphone is not connected to microphone terminal 16, switching portion 29 outputs to codec portion 28 an audio signal accepted from microphone 13.

Display control portion 30 is controlled by control portion 21 and controls LCD 15 in accordance with an instruction input from control portion 21 in order to cause LCD 15 to display operation screens or images. The images that LCD 15 is caused to display include moving images and still images.

To card I/F 27, a detachable flash memory 27A is mounted. Control portion 21 has access to flash memory 27A through card I/F 27. While description is made of an example where ROM 31 stores the programs executed by control portion 21, it is also possible that flash memory 27A stores the programs so that the programs are read from flash memory 27A and executed by control portion 21. The medium to store the programs is not limited to flash memory 27A and may be a flexible disk, a cassette tape, an optical disk (CD-ROM (Compact Disc-ROM), MO (Magnetic Optical Disc), MD (Mini Disc), DVD (Digital Versatile Disc)), an IC card, an optical card, a semiconductor memory such as a masked ROM, an EPROM (Erasable Programmable ROM), and an EEPROM (Electronically EPROM), or the like. It is also possible that mobile phone 1 is connected to the Internet through wireless circuit 22 or wireless LAN circuit 23 so that a program is downloaded from a computer connected to the Internet and executed by control portion 21. The program, as used herein, encompasses not only programs directly executable by control portion 21 but also source programs, compressed programs, encoded programs, and the like.

Camera 24 includes a lens and a photoelectric conversion element such as a CMOS (Complementary Metal Oxide Semiconductor) sensor. The lens collects light and focuses it onto the CMOS sensor, and the CMOS sensor carries out photoelectric conversion of the received light, to output image data to control portion 21. Camera 24 is controlled by control portion 21, and starts image picking-up upon instruction from control portion 21 and outputs obtained still image data or moving image data to control portion 21. Camera 24 includes an image processing circuit that executes image processing for improving the image quality of image data, and an A/D conversion circuit that converts analogue image data into digital data. Control portion 21 outputs to display control portion 30 the still image data or moving image data output from camera 24 and causes LCD 15 to display the data, or encodes the still image data or moving image data by a compression-encoding system and stores the data in an EEPROM 34 or flash memory 27A mounted to card I/F 27. Camera 24 picks up the user of mobile phone 1 when mobile phone 1 functions as a video phone.

Infrared communication portion 19 transmits/receives data with an infrared ray as a medium. For example, in accordance with the IrDA (Infrared Data Association) standard, infrared communication portion 19 transmits/receives data with external appliances. While description is made of an example where data is transmitted/received with an infrared ray as a medium, infrared communication portion 19 may communicate with external appliances by wireless communication using electromagnetic wave.

Communication I/F 26 is an interface that connects mobile phone 1 to computers. The communication I/F may be a serial interface or a parallel interface. When an external computer is connected to communication I/F 26 through a communication cable, control portion 21 becomes capable of communicating with the external computer.

FIG. 4 is a functional block diagram schematically showing the function of the control portion of the mobile phone. Control portion 21 includes a setting mode switching portion 51, a communication control portion 52 that controls wireless circuit 22 and wireless LAN circuit 23, an address directory display portion 53 that displays address directory data stored in EEPROM 33, an address directory changing portion 54 that changes the address directory data, an address directory addition portion 55 that makes an addition to address directory data, and an address directory forwarding portion 56 that transmits the address directory data to another device.

Setting mode switching portion 51 switches the setting modes of mobile phones 1. The setting modes include a first setting mode capable of activating wireless circuit 22 and wireless LAN circuit 23 and a second setting mode capable of activating only wireless circuit 22. Setting mode switching portion 51 writes the switched setting mode in a setting mode storing area of EEPROM 33. When the user inputs an instruction on operation keys 24 to switch setting modes, setting mode switching portion 51 accepts the instruction to switch setting modes from operation keys 24 in order to rewrite the setting mode storing area. Also setting mode switching portion 51 may rewrite the setting mode storing area on condition that a predetermined instruction is input from an external computer connected to communication I/F 26.

Description will be made of data stored in the EEPROM. FIG. 5 is a diagram showing an example of the storing area of the EEPROM. Referring to FIG. 5, EEPROM 33 includes a setting mode storing area for storing the setting modes, an address directory data storing area for storing address directory data, and another storing area for storing other data. The setting mode storing area stores the setting modes in which mobile phone 1 is set.

FIG. 6 is a diagram showing an example of the format of address directory data. Referring to FIG. 6, the address directory data includes identification information, first information, and second information. The item of the identification information is a name for identifying a communication destination. The identification information is not limited to a name and may be any information that enables identification of the communication destination. The items of the first information include information related to the first network, e.g., a telephone number and an electronic mail address, which are assigned to an appliance such as a mobile phone owned by the person identified by the name item in the first network in order to identify the appliance. The second information includes information related to the second network, e.g., an extension number and an instant message number, which are assigned to an appliance such as a mobile phone owned by the person identified by the name item in the second network in order to identify the appliance. The instant message number is a number for, when such a program is executed that instant messages are transmitted/received between a plurality of devices connected to the second network, identifying a destination in order to transmit/receive data between the plurality of devices.

Referring back to FIG. 4, communication control portion 52 reads a setting mode stored in the setting mode storing area of EEPROM 33 and determines whether to activate wireless circuit 22 and wireless LAN circuit 23 in accordance with the read setting mode. Specifically, when the setting mode is the first setting mode, wireless circuit 22 and wireless LAN circuit 23 are activated, while when the setting mode is the second setting mode, wireless circuit 22 is activated and wireless LAN circuit 23 is not activated. Accordingly, in the first setting mode, mobile phone 1 accepts a call from a device connected to the first network or the second network in order to be capable of communicating with the device, and makes a call to a device connected to the first network or the second network in order to be capable of communicating with the device. Also in the first setting mode, mobile phone 1 is capable of transmitting/receiving electronic mails through the first network and transmitting/receiving instant messages through the second network.

When the setting mode is the second setting mode, mobile phone 1 accepts a call from a device connected to the first network in order to be capable of communicating with the device, and makes a call to a device connected to the first network in order to be capable of communicating with the device. However, mobile phone 1 does not accept any calls from devices connected to the second network and is not capable of making any calls to other devices connected to the second network. Also when the setting mode is the second setting mode, mobile phone 1 is capable of transmitting/receiving electronic mails through the first networks, but not capable of transmitting/receiving instant messages through the second network.

When the user inputs on operation keys 14 an instruction to display the address directory data, address directory display portion 53 accepts the display instruction from operation keys 14, reads the address directory data stored in EEPROM 33, and controls display control portion 30 to display the address directory data on LCD 15. Address directory display portion 53 reads a setting mode stored in the setting mode storing area of EEPROM 33 and varies the items displayed on the address directory data depending on the read setting mode. Specifically, when the setting mode is the first setting mode, address directory display portion 53 displays the items of the identification information, the first information, and the second information, while when the setting mode is the second setting mode, address directory display portion 53 displays the items of the identification information and the first information and does not display the items of the second information. This is because in the second setting mode, wireless LAN circuit 23 is not activated by communication control portion 52 and therefore mobile phone 1 cannot connect to the second network, thereby eliminating the need for the items of the second information.

When the user inputs on operation keys 14 an instruction to change the address directory data, address directory changing portion 54 accepts changed address directory data from the operation keys and rewrites the address directory data stored in EEPROM 33 with the changed address directory data. Address directory changing portion 54 reads a setting mode stored in the setting mode storing area of EEPROM 33 and varies the items of the changed address directory data depending on the read setting mode. Specifically, when the setting mode is the first setting mode, address directory changing portion 54 accepts a change in the items of the identification information, the first information, and the second information, while when the setting mode is the second setting mode, address directory changing portion 54 accepts a change in the items of the identification information and the first information and does not accept any changes in the items of the second information. This is because in the second setting mode, wireless LAN circuit 23 is not activated by communication control portion 52 and therefore mobile phone 1 cannot connect to the second network, thereby eliminating the need for changing the items of the second information. When a change in the address directory data is accepted, a change accepting screen for accepting the change is displayed on LCD 15. In the second setting mode, there is no need for displaying the items of the second information, and therefore the display area of LCD 15 can be used effectively.

In the second setting mode, where address directory changing portion 54 does not accept any changes in the items of the second information, it is possible that when the items of the identification information and the first information are changed, corresponding second information is deleted. The deletion includes the processing of rewriting the second information to, for example, a blank or NULL. It is possible that the items of the second information of the address directory data are deleted at the time when the setting mode is switched from the first setting mode to the second setting mode by setting mode switching portion 51. The address directory data targeted for deletion of the items of the second information is not limited to the case of a single set of address directory data, and a plurality of sets of address directory data may be targeted. For example, when the address directory data is composed of groups into which a plurality of set of address directory data are combined, the items of the second information may be deleted on a group basis, or the items of the second information of all of the address directory data included in the address directory data may be deleted.

When the user inputs on operation keys 14 an instruction to add new address directory data, address directory addition portion 55 accepts the new address directory data from the operation keys and carries out the writing of adding the new address data to the address directory data stored in EEPROM 33. Address directory addition portion 55 reads a setting mode stored in the setting mode storing area of EEPROM 33 and varies the items of the added address directory data depending on the read setting mode. Specifically, when the setting mode is the first setting mode, address directory addition portion 55 accepts the items of the identification information, the first information, and the second information of the added address directory data, while when the setting mode is the second setting mode, address directory addition portion 55 accepts the items of the identification information and the first information of the added address directory data and does not accept the items of the second information. This is because in the second setting mode, wireless LAN circuit 23 is not activated by communication control portion 52 and therefore mobile phone 1 cannot connect to the second network, thereby eliminating the need for changing the items of the second information. When addition of address directory data is accepted, an added data accepting screen for accepting the addition is displayed on LCD 15. In the second setting mode, there is no need for displaying the items of the second information, and therefore the display area of LCD 15 can be used effectively.

When the user inputs on operation keys 14 an instruction to transmit the address directory data to another appliance, address directory forwarding portion 56 accepts the transmission instruction from the operation keys and reads the address directory data stored in EEPROM 33 in order to output the data to infrared communication portion 19 or communication I/F 26. Address directory forwarding portion 56 reads a setting mode stored in the setting mode storing area of EEPROM 33 and varies the items of the transmitted address directory data depending on the read setting mode. Specifically, when the setting mode is the first setting mode, address directory forwarding portion 56 reads the items of the identification information, the first information, and the second information and outputs them to infrared communication portion 19 or communication I/F 26, while when the setting mode is the second setting mode, address directory forwarding portion 56 reads the items of the identification information and the first information and outputs them to infrared communication portion 19 or communication I/F 26, and does not transmit the items of the second information. This is because in the second setting mode, wireless LAN circuit 23 is not activated by communication control portion 52 and therefore mobile phone 1 cannot connect to the second network, thereby eliminating the need for the items of the second information. This is also because since in the second setting mode the items of the second information are not changed by address directory changing portion 54 and no addition is carried out to the items of the second information by address directory addition portion 55, the pre-changed, old items of the second information need to be prevented from being transmitted. It is possible that in case of the situation where the external device that is the transmission destination and to which infrared communication portion 19 or communication I/F 26 is connected cannot handle the second information, address directory forwarding portion 56 may read the items of the identification information and the first information even when the setting mode is the first setting mode and output them to infrared communication portion 19 or communication I/F 26 so that the items of the second information are not transmitted.

Figure 7:
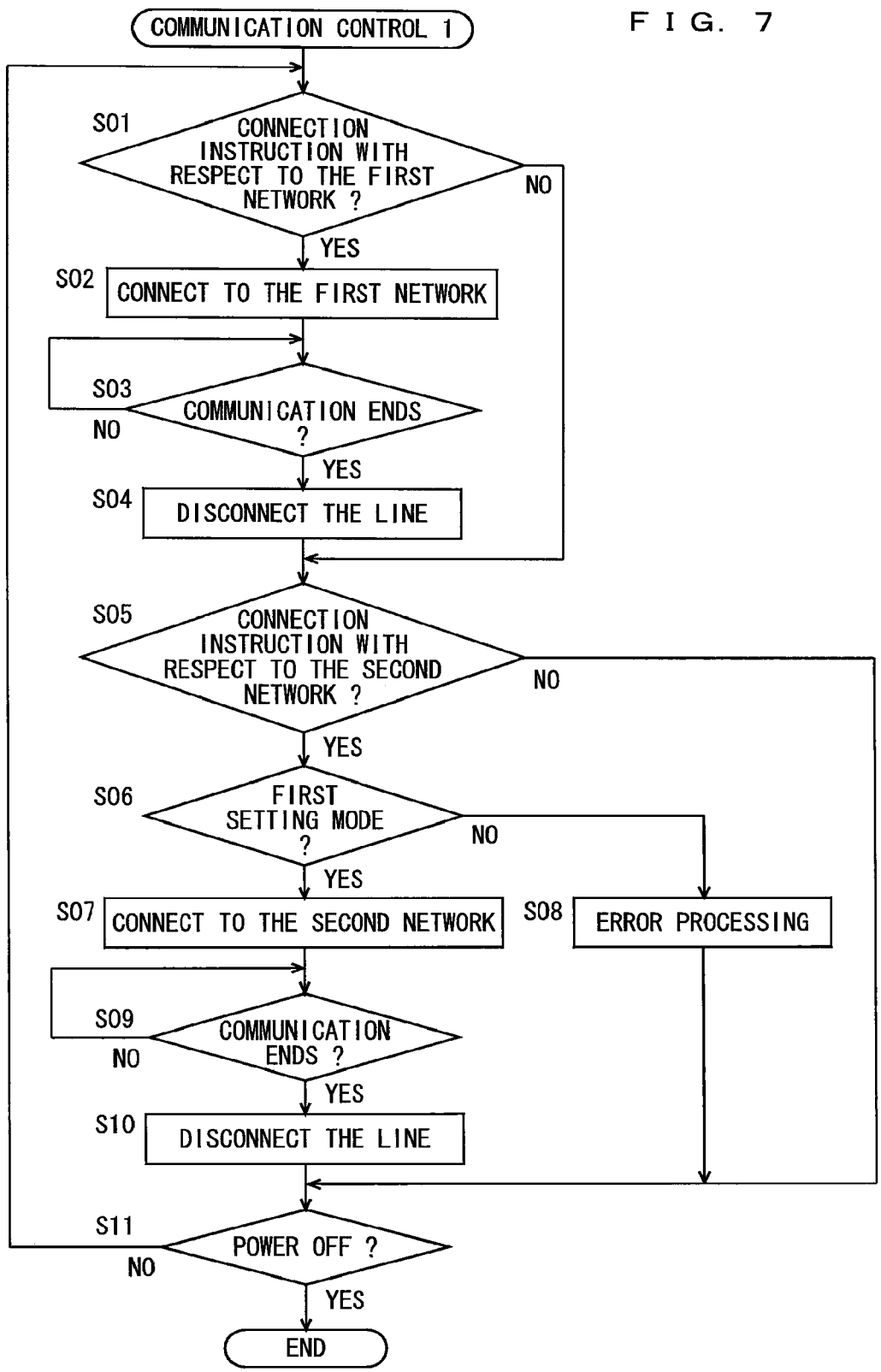
FIG. 7 is a flowchart showing an example of the flow of communication control processing.

FIG. 7 is a flowchart showing an example of the flow of communication control processing. The communication control processing is processing executed by control portion 21 when it executes a communication control program stored in ROM 31. Referring to FIG. 7, control portion 21 judges whether an instruction to connect to the first network is accepted. When the instruction is accepted, control portion 21 proceeds the processing to step S02 while otherwise proceeding the processing to step S05. The instruction to connect to the first network encompasses a calling instruction to a telephone number assigned to a telephone connectable to the first network and a transmission instruction of an electronic mail.

In step S02, control portion 21 controls wireless circuit 22 to connect to the first network. In the case of a calling instruction, control portion 21 establishes a line with the calling destination telephone while transmits an electronic mail in the case of a transmission instruction of an electronic mail. Then control portion 21 judges whether the communication ended (step S03). When the communication has not ended, control portion 21 turns into a stand-by state while proceeding the processing to step S04 when the communication ended. The end of communication is the end of a call or completion of transmission of an electronic mail. In the next step S04, control portion 21 disconnects the line established in step S02 and proceeds the processing to step S05.

In the next step S05, control portion 21 judges whether an instruction to connect to the second network is accepted. When the instruction is accepted, control portion 21 proceeds the processing to step S06 while otherwise proceeding the processing to step S11. The instruction to connect to the second network encompasses a calling instruction to an extension number assigned to a telephone connectable to the second network and a transmission instruction of an instant message.

In step S06, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S07 while proceeding the processing to step S08 when the setting mode is set at the second setting mode. In step S08, control portion 21 executes error processing and proceeds the processing to step S11. The error processing is processing of informing the user that the instruction to connect to the second network cannot be accepted, examples including the processing of sounding a buzzer and the processing of displaying an error message on LCD 15.

In step S07, control portion 21 controls wireless LAN circuit 23 to connect to the second network. In the case of a calling instruction, control portion 21 establishes a line with the calling destination telephone while transmits an instant message in the case of a transmission instruction of an instant message. Then control portion 21 judges whether the communication ended (step S09). When the communication has not ended, control portion 21 turns into a stand-by state while proceeding the processing to step S10 when the communication ended. The end of communication is the end of a call or completion of transmission of an instant message. In the next step S10, control portion 21 disconnects the line established in step S07 and proceeds the processing to step S11.

In step S11, control portion 21 judges whether an instruction to turn off the power of mobile phone 1 is accepted. When the instruction to turn off the power is accepted, control portion 21 ends the processing while otherwise returning the processing to step S01.

Figure 8:
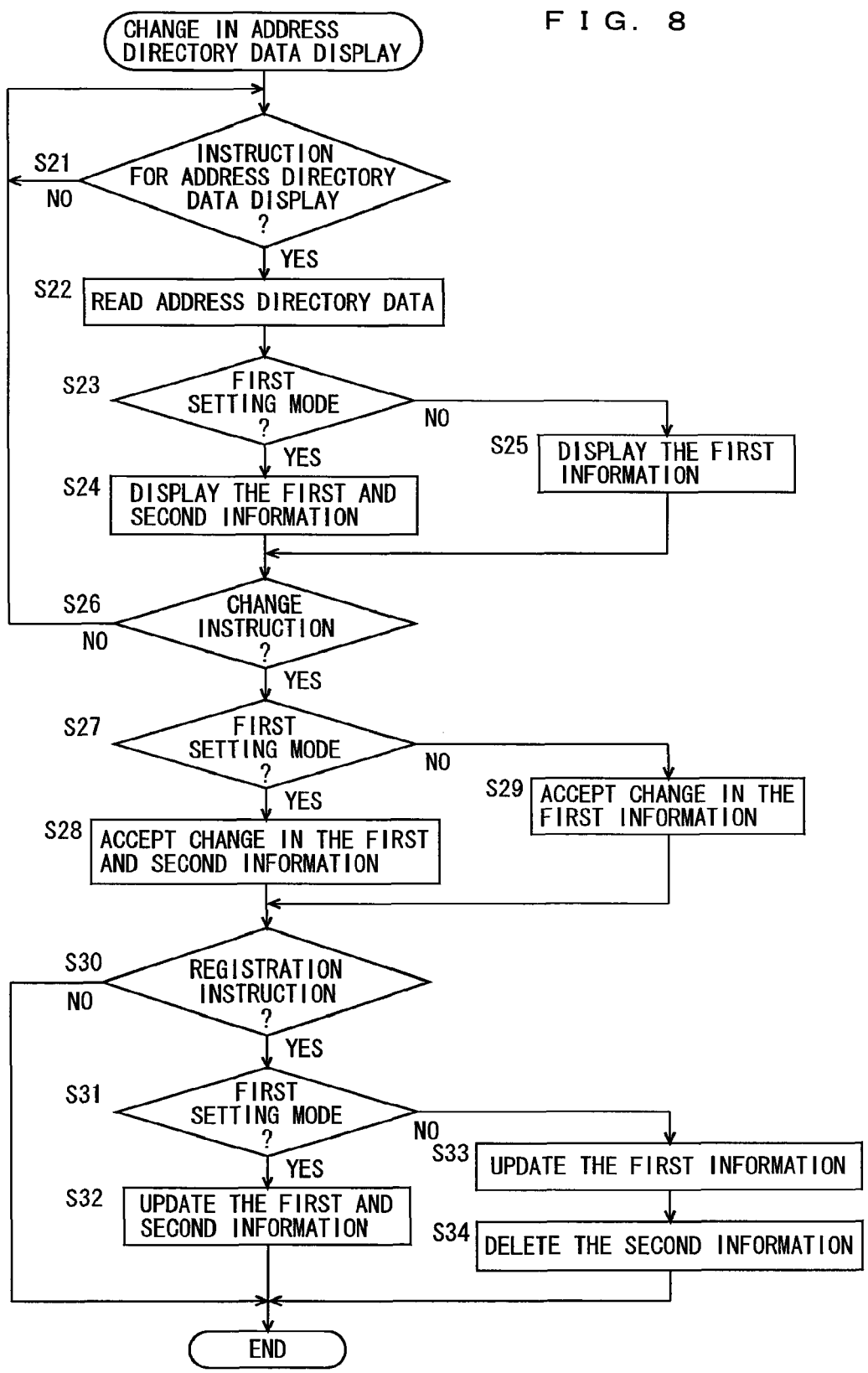
FIG. 8 is a flowchart showing an example of the flow of address directory data display changing processing.

FIG. 8 is a flowchart showing an example of the flow of address directory data display changing processing. The address directory data display changing processing executed by control portion 21 when it executes an address directory data display changing program stored in ROM 31. Referring to FIG. 8, control portion 21 judges whether an address directory data display instruction to display address directory data is accepted (step S21). When the user inputs on operation keys 14 an address directory data display instruction, control portion 21 accepts the address directory data display instruction from operation keys 14. Control portion 21 turns into a stand-by state until reception of the address directory data display instruction ("NO" in step S21), and proceeds the processing to step S22 upon reception of the address directory data display instruction.

In step S22, control portion 21 reads a setting mode from the setting mode storing area of EEPROM 33. On this occasion, when a plurality of sets of address directory data are stored, one set of address directory data selected by the user from the plurality of sets of address directory data may be read, or the plurality of sets of address directory data may be read sequentially on a one-by-one basis. Further, the plurality of sets of address directory data may be read at a time.

In step S23, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S24 while proceeding the processing to step S25 when the setting mode is set at the second setting mode. In step S24, control portion 21 displays on LCD 15 the item of the identification information and the items of both the first information and the second information of the address directory data read in step S22, and proceeds the processing to step S26. In step S25, control portion 21 displays on LCD 15 the item of the identification information and the items of the first information among the items of the first information and the second information of the address directory data read in step S22, and proceeds the processing to step S26. When the setting mode is set at the second setting mode, wireless LAN circuit 23 is not activated, and therefore the items of the second information related to the second network are not used by mobile phone 1. This prevents the items of the second information from being displayed, making it possible to give the user only necessary information. Also, not displaying unnecessary information enables effective use of the display area of LCD 15.

In step S26, control portion 21 judges whether a change instruction is accepted. When the user inputs a change instruction on operation keys 14, control portion 21 accepts the change instruction from operation keys 14. When the change instruction is accepted, control portion 21 proceeds the processing to step S27 while otherwise returning the processing to step S21. In step S27, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S28 while proceeding the processing to step S29 when the setting mode is set at the second setting mode. In step S28, control portion 21 accepts a change in the item of the identification information and at least one of the items of both the first information and the second information of the address directory data read in step S22, and proceeds the processing to step S30. In step S29, control portion 21 accepts a change in at least one of the item of the identification information and the items of the first information among the items of the first information and the second information of the address directory data read in step S22, and proceeds the processing to step S30. When the setting mode is set at the second setting mode, wireless LAN circuit 23 is not activated, and therefore the items of the second information related to the second network are not used by mobile phone 1. This prevents changes in the second information from being accepted, making it possible to save the user unnecessary work.

In step S30, control portion 21 judges whether a registration instruction is accepted. When the user inputs a registration instruction on operation keys 14, control portion 21 accepts the registration instruction from operation keys 14. When the change instruction is accepted, control portion 21 proceeds the processing to step S31 while otherwise ending the processing. In step S31, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S32 while proceeding the processing to step S33 when the setting mode is set at the second setting mode.

In step S32, control portion 21 updates the address directory data with the changed address directory data accepted in step S28. Specifically, using the item of the identification information, the items of the first information, and the items of the second information of the changed address directory data accepted in step S28, control portion 21 respectively overwrites the item of the identification information, the items of the first information, and the items of the second information of corresponding address directory data stored in the setting mode storing area of EEPROM 33.

In step S33, control portion 21 updates the address directory data with the changed address directory data accepted in step S29. Specifically, using the item of the identification information and the items of the first information of the changed address directory data accepted in step S29, control portion 21 respectively overwrites the item of the identification information and the items of the first information of corresponding address directory data stored in the setting mode storing area of EEPROM 33. In the next step S34, control portion 21 deletes the items of the second information of the corresponding address directory data stored in the setting mode storing area of EEPROM 33. Specifically, control portion 21 rewrites each of the items of the second information to a blank or NULL.

FIG. 9 is a diagram showing an example of an address directory data display screen in the first setting mode. This address directory data display screen is a screen display on LCD 15 in step S24 shown in FIG. 8. The address directory data display screen in the first setting mode displays all the data of the items of the address directory data shown in FIG. 6. As the identification information, a name is displayed, a telephone number and an electronic mail address, which are the first information, are displayed, and an extension number and an instant message number (IM), which are the second information, are displayed. It should be noted that while the figure shows a global telephone number as the telephone number of the IP phone in the extension number, the extension number may be any number specified by wireless LAN system 300, such as a four-digit number.

FIG. 10 is a diagram showing an example of the address directory data display screen in the second setting mode. The address directory data display screen is a screen displayed on LCD 15 in step S25 shown in FIG. 8. The address directory data display screen in the second setting mode displays the item of the identification information and the items of the first information among the items of the address directory data shown in FIG. 6. As the identification information, the name is displayed, and the telephone number and the electronic mail address, which are the first information, are displayed. The extension number and the instant message number (IM), which are the second information, are not displayed.

FIG. 11 is a flowchart showing an example of the flow of address directory data addition processing. The address directory data addition processing is processing executed by control portion 21 when it executes an address directory data addition program stored in ROM 31. Referring to FIG. 11, control portion 21 judges whether an address directory data addition instruction to make an addition to the address directory data is accepted (step S41). When the user inputs an address directory data addition instruction on operation keys 14, control portion 21 accepts the address directory data addition instruction from operation keys 14. Control portion 21 turns into a stand-by state until reception of the address directory data addition instruction ("NO" in step S41), and proceeds the processing to step S42 upon reception of the address directory data addition instruction.

In step S42, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S43 while proceeding the processing to step S45 when the setting mode is set at the second setting mode. In step S43, control portion 21 accepts the item of the identification information and at least one of the items of both the first information and the second information of the address directory data, and proceeds the processing to step S44. In step S44, control portion 21 carries out the writing of adding the address directory data accepted in step S43 to the setting mode storing area of EEPROM 33.

In step S45, control portion 21 accepts the item of the identification information and the items of the first information among the items of the first information and the second information, and proceeds the processing to step S46. In step S46, control portion 21 carries out the writing of adding the address directory data accepted in step S45 to the setting mode storing area of EEPROM 33. On this occasion, since the second information is not accepted in step S45, a blank or NULL is written as each of the added and written items of the second information of the address directory data. When the setting mode is set at the second setting mode, wireless LAN circuit 23 is not activated, and therefore the second information related to the second network is not used by mobile phone 1. This prevents the second information from being accepted when an additional registration is accepted to the address directory data, making it possible to save the user unnecessary work.

Figure 12:
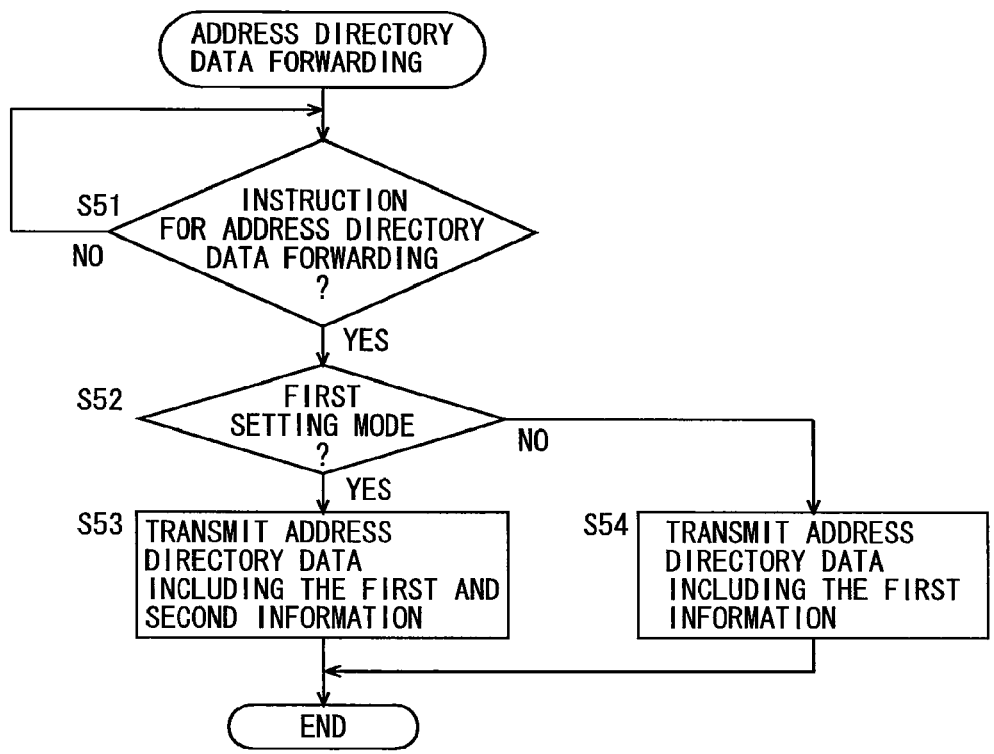
FIG. 12 is a flowchart showing an example of the flow of address directory data forwarding processing.

FIG. 12 is a flowchart showing an example of the flow of address directory data forwarding processing. The address directory data forwarding processing is executed by control portion 21 when it executes an address directory data forwarding program stored in ROM 31. Referring to FIG. 12, control portion 21 judges whether an address directory data forwarding instruction to forward the address directory data is accepted (step S51). When the user inputs an address directory data forwarding instruction on operation keys 14, control portion 21 accepts the address directory data forwarding instruction from operation keys 14. Control portion 21 turns into a stand-by state until reception of the address directory data forwarding instruction ("NO" in step S51), and proceeds the processing to step S52 upon reception of the address directory data forwarding instruction.

In step S52, control portion 21 judges whether the setting mode is set at the first setting mode. Control portion 21 reads a setting mode stored in the setting mode storing area of EEPROM 33 and judges whether the read setting mode is the first setting mode. When the setting mode is set at the first setting mode, control portion 21 proceeds the processing to step S53 while proceeding the processing to step S54 when the setting mode is set at the second setting mode. In step S53, control portion 21 transmits address directory data including the item of the identification information and the items of both the first information and the second information of the address directory data. Specifically, control portion 21 reads the address directory data from the setting mode storing area of EEPROM 33 and outputs the read address directory data to infrared communication portion 19 or communication I/F 26 in order to cause infrared communication portion 19 or communication I/F 26 to transmit the data.

In step S54, control portion 21 transmits address directory data including the item of the identification information and the items of the first information among the items of the first information and the second information of the address directory data. Specifically, control portion 21 reads the address directory data from the setting mode storing area of EEPROM 33 and outputs the item of the identification information and the items of the first information of the read address directory data to infrared communication portion 19 or communication I/F 26 in order to cause infrared communication portion 19 or communication I/F 26 to transmit the items. Thus, the items of the second information are not transmitted. When the setting mode is set at the second setting mode, wireless LAN circuit 23 is not activated, and therefore the second information related to the second network is not used by mobile phone 1. In the second setting mode, the second information is not involved with a change in or addition to the address directory data, and therefore, when the address directory data is transmitted, the second information is prevented from being transmitted, thereby enhancing the reliability of transmitted data.

As has been described hereinbefore, in mobile phone 1 according to the first embodiment, the setting mode is switched between the first setting mode and the second setting mode and stored in the setting mode storing area of EEPROM 33. When the setting mode stored in the setting mode storing area of EEPROM 33 is the first setting mode, communication control portion 52 activates wireless circuit 22 and wireless LAN circuit 23 and therefore is capable of communicating with a device connected to the first network or the second network. When the setting mode stored in the setting mode storing area of EEPROM 33 is the second setting mode, communication control portion 52 activates wireless circuit 22 but does not activate wireless LAN circuit 23, and therefore is capable of communicating only with a device connected to the first network. Thus, merely by the switching of the setting mode, it is possible to limit connectable networks.

When the setting mode stored in the setting mode storing area of EEPROM 33 is the first setting mode, address directory display portion 53 displays the items of the first information and the items of the second information of the address directory data, while in the case of the second setting mode, address directory display portion 53 displays only the items of the first information among the items of the first information and the items of the second information of the address directory data. Thus, items of the address directory data to be displayed can be varied depending on the form of application, thereby displaying only necessary information.

A mobile communication terminal capable of inputting/outputting is provided.

When the setting mode stored in the setting mode storing area of EEPROM 33 is the first setting mode, address directory changing portion 54 accepts a change in the items of the first information and the items of the second information of the address directory data and carries out the change, while in the second setting mode, address directory changing portion 54 accepts a change in the items of the first information among the items of the first information and the items of the second information of the address directory data and carries out the change. Thus, items of the address directory data that can be changed can be varied depending on the form of application, thereby preventing changing work from being carried out with respect to unnecessary information.

When the setting mode stored in the setting mode storing area of EEPROM 33 is the first setting mode, address directory addition portion 55 accepts an addition to the items of the first information and the items of the second information of the address directory data and carries out and stores the addition, while in the second setting mode, address directory addition portion 55 accepts an addition to the items of the first information among the items of the first information and the items of the second information of the address directory data and carries out and stores the addition. Thus, items of the address directory data that can be added are varied depending on the form of application, thereby preventing changing work from being carried out with respect to unnecessary information.

When the setting mode stored in the setting mode storing area of EEPROM 33 is the first setting mode, address directory forwarding portion 56 transmits the items of the first information and the items of the second information of the address directory data, while in the second setting mode, address directory forwarding portion 56 transmits the items of the first information among the items of the first information and the items of the second information of the address directory data. Thus, items of the address directory data to be transmitted can be varied depending on the form of application, thereby preventing unnecessary information from being transmitted and enhancing the accuracy of the transmitted address directory data.

<Second Embodiment>

Communication system 10 according to a second embodiment differs from communication system 10 according to the first embodiment in that communication system 10 according to the second embodiment includes a plurality of second networks. Description will be made mainly of respects in which communication system 10 according to the second embodiment differs from communication system 10 according to the first embodiment.

Communication system 10 according to the second embodiment has a similar structure to that of wireless LAN system 300 and includes a different kind of wireless LAN system with a different communication protocol. For example, when wireless LAN system 300 is assumed to be a first LAN established in a company, there may be a case where a second LAN is established in a household. While the case where the first LAN and the second LAN exist as the second networks is exemplified here, the number of the wireless LANs is not limited to two insofar as a plurality of wireless LANs exist. The wireless LANs included in the second networks include a wireless LAN provided by a telephone service provider.

Although the first LAN and the second LAN included in the second networks each have access points for wireless communication with mobile phone 1, there may be a case where the communication protocol used in the first LAN differs from the communication protocol used in the second LAN. In view of this, in order to connect to the first LAN and the second LAN, mobile phone 1 uses one wireless LAN circuit 23 to store application programs corresponding to the LANs in EEPROM 33 and activates a suitable application program at the time of connection, thus coping with the difference of communication protocols. The application program activated upon connection to the first LAN will be referred to as a first LAN corresponding application program, and the application program activated upon connection to the second LAN will be referred to as a second LAN corresponding application program.

Mobile phone 1 downloads the first LAN corresponding application program and the second LAN corresponding application program from computer 116 or the like connected to Internet 115 and stores them in EEPROM 33.

Figure 13:
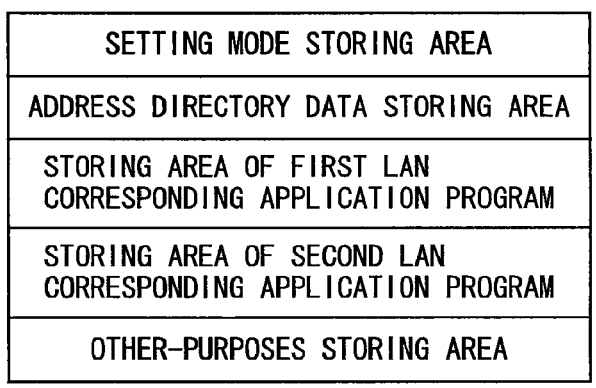
FIG. 13 is a diagram showing an example of the storing area of an EEPROM according to a second embodiment of the present invention.

FIG. 13 is a diagram showing an example of the storing area of the EEPROM according to the second embodiment of the present invention. Referring to FIG. 13, the storing area differs from that shown in FIG. 5 in that an area for storing the first LAN corresponding application program and area for storing the second LAN corresponding application program are added.

FIG. 14 is a diagram showing an example of the format of address directory data according to the second embodiment of the present invention. Referring to FIG. 14, the address directory data differs from that shown in FIG. 6 in that the items of the second information include items corresponding to the first LAN and items corresponding to the second LAN. The items of the first LAN include information related to the first LAN of the second network and include an extension number and an instant message number assigned to an appliance such as a mobile phone owned by the person identified by the name item in the first LAN. The items of the second LAN include information related to the second LAN of the second network and include an extension number and an instant message number assigned to an appliance such as a mobile phone owned by the person identified by the name item in the second LAN.

In the first setting mode, upon reception of an instruction to connect to the first LAN, communication control portion 52 reads the first LAN corresponding application program from EEPROM 33 and executes the program. This connects mobile phone 1 to the first LAN. Also in the first setting mode, upon reception of an instruction to connect to the second LAN, communication control portion 52 reads the second LAN corresponding application program from EEPROM 33 and executes the program. This connects mobile phone 1 to the second LAN.

Figure 15:
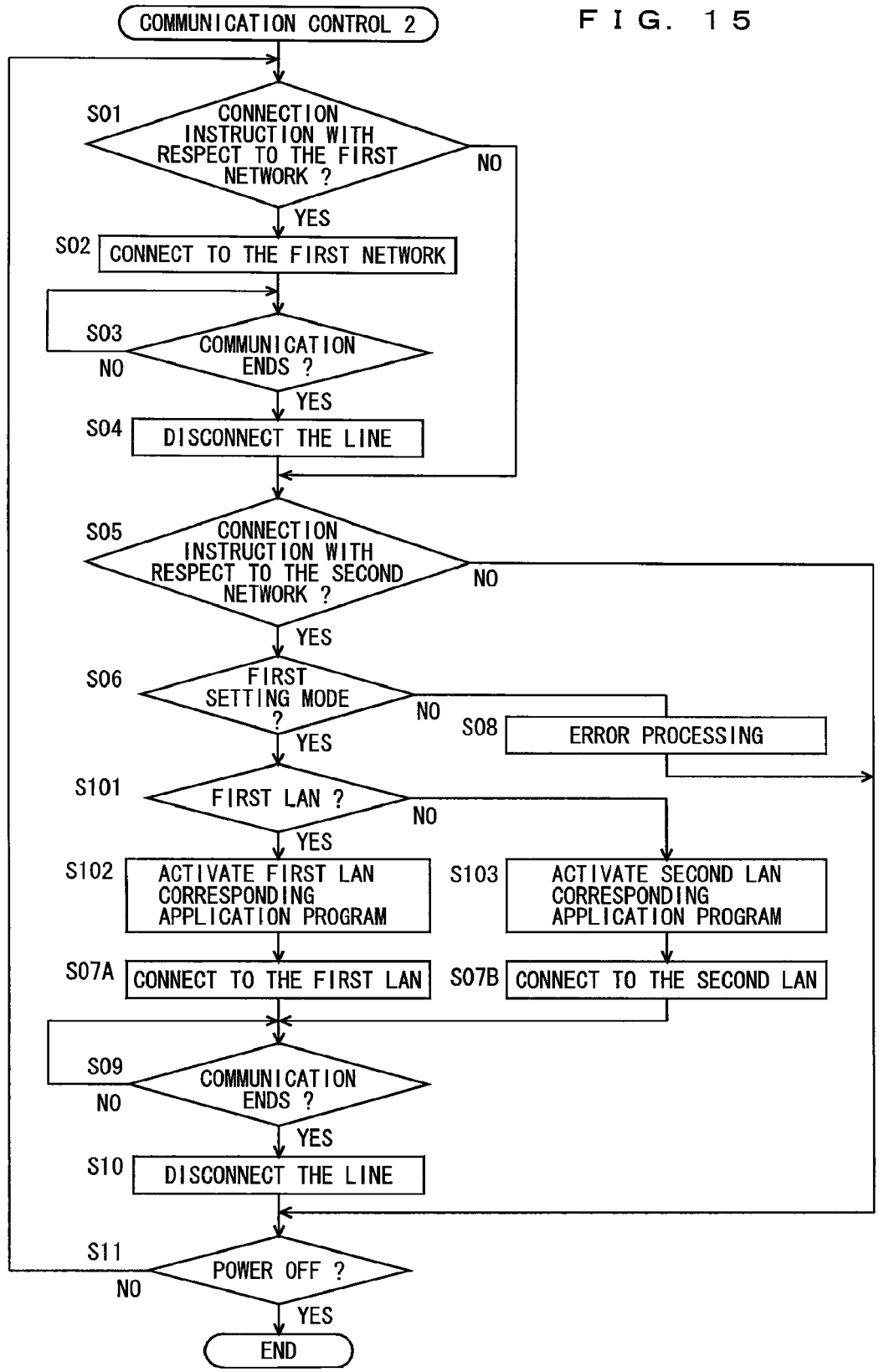
FIG. 15 is another flowchart showing an example of the flow of the communication control processing.

FIG. 15 is another flowchart showing an example of the flow of the communication control processing. Referring to FIG. 15, the communication control processing differs from that shown in FIG. 7 in that steps S101, S102, S103, S07A, and S07B are added in place of step S07. The other parts of the processing are the same as the communication control processing shown in FIG. 7, and therefore, description thereof will not be repeated.

In step S06, control portion 21 proceeds the processing to step S101 when the setting mode is set at the first setting mode while proceeding the processing to step S08 when the setting mode is set at the second setting mode.

In step S101, control portion 21 judges whether the connection instruction accepted in step S05 is regarding the first LAN. When the connection instruction is with respect to the first LAN, control portion 21 proceeds the processing to step S102 while proceeding the processing to step S103 when the connection instruction is regarding the second LAN. In step S102, control portion 21 activates the first LAN corresponding application program. Specifically, control portion 21 reads the first LAN corresponding application program from EEPROM 33 and executes the program. Then control portion 21 controls wireless LAN circuit 23 to connect to the first LAN (step S07A), and proceeds the processing to step S09. In step S103, control portion 21 activates the second LAN corresponding application program. Specifically, control portion 21 reads the second LAN corresponding application program from EEPROM 33 and executes the program. Then control portion 21 controls wireless LAN circuit 23 to connect to the second LAN (step S07B), and proceeds the processing to step S09.

In mobile phone 1 according to the second embodiment of the present invention, similarly to mobile phone 1 according to the first embodiment, the address directory data display changing processing, the address directory data addition processing, and the address directory data forwarding processing are carried out, and the only difference is that the second information includes the items of the second LAN in addition to the items of the first LAN.

FIG. 16 is another diagram showing an example of the address directory data display screen in the first setting mode. The address directory data display screen in the first setting mode displays all the data of the items of the address directory data shown in FIG. 14. As the identification information, a name is displayed, and a telephone number and an electronic mail address, which are the first information, are displayed. As the second information, the extension number and the instant message number (IM) that are the items of the first LAN (company LAN), and the extension number and the instant message number (IM) that are the items of the second LAN (household LAN) are displayed.

During connection to the first LAN, only the items of the first LAN may be displayed among the items of the second information while the items of the second LAN are not displayed. Likewise, during connection to the second LAN, only the items of the second LAN may be displayed among the items of the second information while the items of the first LAN are not displayed. Further, during connection to the first LAN, only the items of the first LAN among the items of the second information may be subjected to change, addition, or transmission while the items of the second LAN are not subjected to change, addition, or transmission. Likewise, during connection to the second LAN, only the items of the second LAN among the items of the second information may be subjected to change, addition, or transmission while the items of the first LAN are not subjected to change, addition, or transmission.

As has been described hereinbefore, mobile phone 1 according to the second embodiment stores in EEPROM 33 the first LAN application program and the second LAN application program respectively corresponding to the first LAN and the second LAN, and executes the first LAN application program upon selection of the first LAN when the setting mode is switched to the first setting mode while executing the second LAN application program upon selection of the second LAN. This enables connection to either the first LAN or the second LAN with one wireless LAN circuit even when the first LAN and the second LAN have different communication programs.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A mobile communication terminal comprising:
a display;
a switching portion to switch the mobile communication terminal between a first setting mode in which the mobile communication terminal has an option of connecting to a first network and a second network, and a second setting mode in which the mobile communication terminal only has an option of connecting to said first network and not said second network;
a memory comprising information for communicating with each of one or more parties, wherein the information for communicating with at least one of the one or more parties comprises first information and second information, wherein the first information comprises an electronic mail address for communicating with the at least one party via the first network, and wherein the second information comprises an instant messaging address for communicating with the at least one party via the second network; and
a providing portion to, in response to a user operation,
when the mobile communication terminal is in the first setting mode, display both the first information and the send information for the at least one party on the display, and,
when the mobile communication terminal is in the second setting mode, display the first information for the at least one party on the display, but not display the second information for the at least one party on the display.

2. The mobile communication terminal of claim 1, wherein the information for communicating with the at least one party further comprises an identification of the at least one party.

3. The mobile communication terminal of claim 2, wherein the identification comprises a name of the at least one party.

4. The mobile communication terminal of claim 1, wherein one of the first network and the second network comprises a mobile phone system, and wherein the other of the first network and the second network comprises a wireless Local Area Network (LAN) system.

5. The mobile communication terminal of claim 4, further comprising:
a wireless circuit for connecting to the mobile phone system; and
a wireless LAN circuit for connecting to the wireless LAN system.

6. The mobile communication terminal of claim 5, wherein, when the mobile communication terminal is in the first setting mode, both the wireless circuit and the wireless LAN circuit are activated, and wherein, when the mobile communication terminal is in the second setting mode, only one of the wireless circuit and the wireless LAN circuit is activated.

7. The mobile communication terminal of claim 1, wherein the user operation is a change operation, and wherein the providing portion further:
when the mobile communication terminal is in the first setting mode, accepts a user modification of one or both of the first information and the second information; and,
when the mobile communication terminal is in the second setting mode, accepts a user modification of only the first information.

8. The mobile communication terminal of claim 7, wherein the providing portion, when the mobile communication terminal is in the second setting mode, deletes the second information.

9. The mobile communication terminal of claim 1, wherein the providing portion, in response to a transmission operation:
when the mobile communication terminal is in the first setting mode, transmits both the first information and the second information to an interface for the communicating with an external device, and,
when the mobile communication terminal is in the second setting mode, transmits the first information but does not transmit the second information to the interface for communicating with the external device.

10. The mobile communication terminal of claim 1, further comprising an addition portion to, in response to a user operation for adding a party to the information:
when the mobile communication terminal is in the first setting mode, accept both first information and second information for the party to be added; and, when the mobile communication terminal is in the second setting mode, accept first information but not accept second information for the party to be added.

11. A method for switching modes in a mobile communication terminal, the method comprising:
  maintaining, in the mobile communication terminal, information for communicating with each of one or more parties, wherein the information for communicating with at least one of the one or more parties comprises first information and second information, wherein the first information comprises an electronic mail address for communicating with the at least one party via the first network, and wherein the second information comprises an instant messaging address for communicating with the at least one party via the second network;
  by the mobile communication terminal, switching between a first setting mode in which the mobile communication terminal has an option of connecting to a first network and a second network, and a second setting mode in which the mobile communication terminal only has an option of connecting to said first network and not said second network; and
  responding to a user operation by
    determining whether the mobile communication terminal is in the first setting mode or the second mode,
    when the mobile communication terminal is in the first setting mode, displaying both the first information and the second information for the at least one part on a display, and
    when the mobile communication terminal is in the second setting mode, displaying the first information for the at least one party on the display but not displaying the second information for the at least one party on the display.

12. The method of claim 11, wherein the user operation is a change operation, and wherein responding to the user operation further comprises:
  when the mobile communication terminal is in the first setting mode, accepting a user modification of one or both of the first information and the second information; and,
  when the mobile communication terminal is in the second setting mode, accepting a user modification of only the first information.

13. The method of claim 12, wherein responding to the user operation further comprises, when the mobile communication terminal is in the second setting mode, deleting the second information.

14. The method of claim 11, further comprising responding to a transmission operation by:
  when the mobile communication terminal is in the first setting mode, transmitting both the first information and the second information to an interface for communicating with an external device; and,
  when the mobile communication terminal is in the second setting mode, transmitting the first information but not transmitting the second information to the interface for communicating with the external device.

15. The method of claim 11, further comprising responding to a user operation for adding a party to the information for communicating with each of one or more parties by:
  when the mobile communication terminal is in the first setting mode, accepting both first information and a second information for the party to be added; and,
  when the mobile communication terminal is in the second setting mode, accepting first information but not accepting second information for the party to be added.

* * * * *